| United States Patent [19] | [11] 4,167,587 |
|---|---|
| Danforth | [45] Sep. 11, 1979 |

[54] COMPOSITIONS AND PROCESS FOR COLORED LIQUID FOOD OR DRINK

[76] Inventor: Richard C. Danforth, 6808 Algon Ave., Philadelphia, Pa. 19111

[21] Appl. No.: 808,731

[22] Filed: Jun. 22, 1977

[51] Int. Cl.² .............................................. A23L 2/00
[52] U.S. Cl. ................................... 426/250; 426/540; 426/590
[58] Field of Search ................. 426/250, 96, 540, 590, 426/591, 599

[56] References Cited

U.S. PATENT DOCUMENTS

| 3,425,841 | 2/1969 | Handwerk et al. | 426/540 |
|---|---|---|---|
| 3,483,002 | 12/1969 | Stein | 426/250 |
| 3,525,624 | 8/1970 | Rubenstein | 426/590 |
| 3,769,041 | 10/1973 | Levinson et al. | 426/250 |

*Primary Examiner*—Jeanette M. Hunter
*Attorney, Agent, or Firm*—Eugene Chovanes; Edward Lovett Jackson

[57] ABSTRACT

A liquid food or drink with a pH of below 4.2 includes erythrosine (Red No. 3 and/or its lakes) and an edible soluble or dispersable protein the protein is stained by the erythrosine which is subsequently solubilized or dispersed throughout the food or beverages whereby such food or drink is colored. Also involved here are preparations such as dry mixes, frozen concentrates and syrups.

6 Claims, No Drawings

COMPOSITIONS AND PROCESS FOR COLORED LIQUID FOOD OR DRINK

DESCRIPTION OF INVENTION

My invention relates to a composition and process for liquid food or drink.

A purpose of my invention is to provide such a composition in which a liquid food or drink having a pH of below 4.2 is provided with an especially appealing color which will hold its value, at a cost much below natural colors.

Further purposes will appear in the rest of the specification and claims.

My present invention relates to a method for coloring acidified liquid foods and beverages, and more particularly to such a method in which FD & C Red #3 and/or its lakes, which I shall together hereinafter denominate erythrosine, is used as a coloring matter which in itself is not soluble or insufficiently soluble in the acidic liquids to be colored, and to the products of the method.

The only certified red colors presently available for use in foods in the United States of America are FD & C Red #3 and FD & C Red #40 since the de-listing of Violet #1 in 1973, and Red #2, and Red #4, both in 1976, which de-listing had the effect of withdrawing the approval by the Federal Food and Drug Administration of their use.

FD & C Red #40 is soluble in acidic drinks but its hues are reddish-orange and not equivalent in replacing the de-listed Red #2 in coloring for instance, grape and other redrelated drinks.

FD & C Red #3 and its lakes (erythrosine) by this invention is now made soluble, dispersable, or otherwise usable in a wide variety of liquid acidic drinks and beverages and has a special advantage over FD & C Red #40 of having a bluish-red hue in these beverages.

I have found that certain materials, namely proteins which are edible, capable of being substantially stained, and either substantially soluble or capable of forming a suspension, or in other words in either case capable of substantial distribution throughout a liquid, can be employed with erythrosine to give a result in which the erythrosine and protein will suitably color the acidic liquid food or beverage of which they form a part.

In addition to making Red #3 available for use in the acidic liquid foods and drinks, also, in view of the increasing need for high quality nutrition, this invention gives an extra advantage of having more protein added to the diets of the people of our modern generation who drink these beverages. The liquid acidic foods and beverages involved include things such as: acidic beverages, both carbonated and non-carbonated, alchololic and non-alchololic, nutritionally fortified drinks, fountain syrups, dry beverage mixes, extracts, concentrates, frozen concentrates, etc. for such use in making these acidic beverages. By acidic in this connection, I mean such items having a pH below 4.2. It should preferably but not necessarily also have a pH of 1.5 or above.

When carrying out my new coloring method it is a matter of indifference whether the erythrosine and/or protein or protein-containing material is added during, before or after the mixture of the sweeteners, acidulants, and/or other proper ingredients of the drinks and beverages, except insofar as further indicated.

Preferably the erythrosine and the edible protein or protein-containing material are mixed or added in the solution before the food acidulants to absorb, or stain, the erythrosine on the protein molecule at neutral or slightly alkaline pH's.

A wide variety of edible proteins can be used in this invention. The edible proteins as herein defined are edible protein, and also protein-containing material, and include among other things vegetable proteins in any suitable form such as soybeans, peanuts, sesame seeds, safflower seeds, cottonseeds, and grains (barley, wheat, etc.), legumes, microorganisms such as algae, bacteria, yeasts, fungi, protein extracts, and isolates of such materials, animal protein materials such as meat, milk, eggs, caseins, milk albumins and globulins, whey, whey protein extracts or compounds, egg whites (dried, denatured or natural), fish meal, fish proteins, serum albumins, gelatins, animal or vegetable by-products. These proteins or protein-containing materials may or may not be chemically or physically modified to enhance functional properties such as solubility, dispersability, stainability, binding ability, etc., and may or may not be extracted, isolated, milled, emulsified, heated, spray or otherwise dried or concentrated, partially hydrolysed, chemically treated with agents such as: acids, bases, soaps, salts, water, fats, sequestrants, surfactants, digesting agents (pepsin, trypsin, and other enzymes), suspending agents, emulsifiers, etc. or any combinations thereof.

The liquid foods and beverages may be sweetened with for example: sugar, dextrose, saccharin, fructose, cornsyrup, lactose, sorbitol, and the like which may be used alone or in any combinations.

The acidulants employed for lowering and adjusting the pH may be any suitable edible acidulant such as: citric, tartaric, phosphoric, malic, acetic, fumaric, adipic, etc. or any combinations of these.

It will be understood that the proportions of the proper ingredients such as: the ratio of flavors, acidulants, sweeteners, buffers, etc. are not critical but may be varied within the desired balance of the ultimately marketed or used mixtures.

It will also be understood that other food grade dyes and colorants (natural, artificial, or certified) may be employed in selected amounts in the food goods and drinks to enhance or modify the shade, or tinctorial effect of the erythrosine.

Such additive dyes or colors, for example, may be FD & C Red #40, FD & C Blue #1, FD & C Blue 190 2, FD & C Green #3, FD & C Yellow 190 5, FD & C Yellow #6, carotenoids, anthocyanins, Betacyanins, alkanet, cochineal, lac dyes, Monascin, beet juices, extractives or concentrates, and other fruit and vegetable dyes such as grape juice, grape sin extracts, etc. that are compatible with the edible protein and other proper ingredients used in these beverages.

It is further understood that edible protein, erythrosine, acidulants, pH buffers, salts, various flavors, water, sweeteners, clouding agents, vitamins, dispersing agents, alcohol, anti-caking agents, carbon dioxide, thickeners, antioxidants, preservatives, and the like can be added in any proper compatible amounts. Preferably the edible protein to be contacted with the aqueous medium may be in any suitable form which provides an adequate degree of contact with the aqueous medium, such as in the form of flakes, meal, flour, and the like, advantageously in comminuted form for example 60 Mesh or finer. Preferably, the edible protein used is in somewhat refined form, for example, whey protein, egg albumin, wheat protein solubles, solubilized casein, and the like. There is no necessity to separate the non-proteineous material from the protein before addition of the erythrosine, acidulants, buffers and the like, although this separation step can be carried out if desired. It will be understood that various temperatures and pressures may be used to effect the desired results. It is further understood that the erythrosine and edible protein may be blended or dry-mixed separately, or together, or with any one or combinations of the sweeteners, acidulants, water, emulsifiers, thickeners, buffers, salts, fruit or vegetable juices, alcohol, colors and dyes, vitamins, flavors, sequestrants, etc., and any other proper ingredients used to make a marketable acidic liquid food, drink or dry beverage mix. The protein containing material may also be used, for example, to encapsulate (by spray drying and the like) the erythrosine, flavors, acidulants or any one or combinations of the properly used ingredients of the said liquid foods, beverages and dry beverage mixes. Modern technology may, for example, mix or combine the edible protein with the erythrosine in many ways in the finished marketable product.

There is a theory according to which it is generally believed that the functional properties of the proteins are due to the available reactive chemical sites on the long-chain protein molecule (i.e., epsilon amino groups, phenolic, sulfhydryl, alpha-amino, alpha-carbonyl, imidazolium, alcoholic polar, non-polar, etc. groups). These groups are responsible for the solubility, dispersability, stainability, whipping ability, binding ability, coagulability, emulsifying ability and other functional properties of the protein.

It should be borne in mind that many substances (i.e. tannins, soaps, fats, gums, salts, etc. will affect the proteins' ability to dissolve or disperse in aqueous liquids. It is also known that many substances affect the proteins' ability to be stained (i.e. mordants, dyeing assists, salts, etc.) for example in the dyeing of wool, hair, silk, leather, etc. It is preferred not to overstain the protein molecule as this might have a tendency to diminish the residual reactive sites that make for the solubility or dispersability of the stained protein molecule. It is interesting to note that if the protein chain is hydrolysed into its amino acids, a precipitate is formed with erythrosine, probably because the individual amino acid/erythrosine combinations are not soluble. If the erythrosine comes down as a precipitate, this prevents it from being effective as coloring matter. The iso-electric points of some stained proteins are different from their unstained form, and might be precipitated at different pH's. The stained proteins may be precipitated from solution at their iso-electric points and filtered or centrifuged as a means of separation or purification.

The methods for determining the degree that proteins are stained (i.e. chromatography, dialysis, electrophoresis, etc.) are well documented in the literature.

Specific proteins which would be suitable and which I would prefer to use are albumins, globulins, glutelins, sclero-proteins, collagens, elastins, prolamins, histones, fibrins, globins, caseins, proteoses, peotones, enzymes and acylated proteins, and non-interactive mixtures thereof.

Any suitable ratio of protein to erythrosine may be used. However, the user should be careful to use enough edible protein in proportion to erythrosine to be sure to prevent precipitation out of the erythrosine. The results in the Examples afford illustrative guidance over a broad spectrum of situations. In any case where this may not pinpoint the actual specific values to be used, a protein to erythrosine ratio in the drink or liquid food of eight to ten to one should be used initially, with adjustment if necessary to give desired results.

Also suitable and preferred as proteins are the following types of conjugated proteins: nucleoproteins, glucoproteins, and phospho proteins, as well as non-interactive mixtures thereof with other preferred proteins.

EXAMPLE I 3.0 grams of finely ground roasted peanuts which had been defatted by conventional hexane extraction was mixed with 100 grams sugar, 2.0 grams citric acid, 2.0 grams Malic acid, 0.2 grams spray dried fruit punch flavor, 0.1 grams tricalcium phosphate, 0.1 grams salt, 0.1 grams Vitamin C, 0.10 grams FD & C Red #3 powder, 0.07 grams FD & C Red #3, 18% aluminum lake. This was mixed thoroughly to form a dry beverage mix. 20 grams of this mixture was stirred into 200 cc cold water to form a fruit punch. The color was bluish-red and contained bluish-red microscopic suspended particles which had the appearance of suspended fruit pulp, and a typical very good fruit punch taste.

EXAMPLE II 3.0 grams of solubilized soy protein isolate and 3.0 grams of wheat flour solubles 20% protein, were also each effective replacements for the 3.0 grams of finely ground roasted peanuts in Example I.

EXAMPLE III 10 grams of a 50% dried whey protein was dissolved in 250 ml warm tap water. To this a solution of 0.5 grams FD & C Red #3 in 20 ml $H_2O$ was added, stirred, and about 200 ml of this solution was put in a pan to air dry. The dried material was powdered to 100 mesh.

1.0 grams of this powdered color was mixed into a dry mix beverage base consisting of:
100 grams sugar
2.7 grams malic acid
0.6 grams spray dried grape flavor (artificial)
0.1 grams tricalcium phosphate
0.1 grams salt
0.1 grams Vitamin C
0.01 grams FD & C Blue #1
50 grams of this finished artificial grape ade mix was added to 70 cc warm to form a finished fountain type syrup.

This syrup was added to 350 ml of club soda plus 0.4 grams sodium benzoate in 30 ml warm water to form a finished carbonated artificial grape flavored soda.

EXAMPLE IV

The white of one medium size egg was added to 1500 cc of tap water, stirred and gravity filtered. 100 ml of this solution plus 400 ml tap water and FD & C Red #3 (to proper color) plus 50 grams of the dry mix beverage base of Example III was stirred and re-filtered. This finished beverage had good flavor, color and tartness.

EXAMPLE V 4 grams of dried whey protein of Example III was added to 200 ml cold tap water plus 0.2 grams FD & C Red #3. This was stirred very well to dissolve, and a small amount of this solution was used to color a commercial 28 ounce bottle of diet lemon soda (carbonated water, citric acid, sodium saccharin, sodium citrate, natural and artificial flavors, and sodium benzoate as a preservative). A small amount of ethyl maltol and strawberry flavor was added to impart a characteristic strawberry lemon flavor.

EXAMPLE VI

A dry beverage mix consisting of:
100 grams sugar
3.0 grams citric acid
0.2 grams artificial spray dried cherry flavor
0.1 grams tricalcium phosphate
0.1 gram Vitamin C 10 grams of this mix was stirred into 12 ml tap water and colored a deep red with the dried whey protein of Example III and FD & C Red #3 solution of Example V. This was placed in an ice cube tray to form a frozen drink concentrate, which reconstitutes very well with water.

EXAMPLE VII 10 grams of the dried whey protein of Example III, together with FD & C Red #3 was milled in a high speed impact type coffee mill, dissolved in a little water, and used to color each of the following foods and drinks a deep red color:

A. A commercial 28 ounce bottle of tonic water. (carbonated water, sugar, malic acid, quinine sulfate, natural flavorings, benzoate of soda)

B. A 16 ounce commercial bottle of white vinegar, all with good stable results.

EXAMPLE VIII

A dry beverage mix was made up consisting of
100 grams sugar
3.0 grams citric acid
0.2 grams artificial strawberry flavor (spray dried)
0.2 grams artificial punch flavor (spray dried)
0.1 gram Vitamin C
2.5 gram of solubilized dried 34% whey protein
0.09 gram Red #3

Three teaspoons of this mix was used to make a punch type alcoholic cocktail using 1½ ounces Vodka. The results were excellent in appearance, stability and flavor.

In view of my invention and disclosure, variations and modifications to meet individual whim or particular need will doubtless become evident to others skilled in the art to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. A purple-colored-grape-flavored liquid food or beverage having a coloration between red and blue and having a pH under 4.2, comprising water, an edible soluble or dispersible protein, erythrosine, and a potable liquid purple-colored-grape-flavored beverage base, said protein being stained by said erythrosine and dispersed throughout said liquid food or beverage.

2. A colored liquid food or beverage of claim 1, in which the protein selected from the group is consisting of vegetable proteins, animal proteins, salts derived from such proteins, and combinations thereof.

3. The process of imparting a bluish-red coloration to a liquid food or beverage having a pH under 4.2, comprising combining water, edible soluble or dispersible protein, erythrosine, and acid to provide said liquid food or beverage, wherein said acid is in an amount effective to provide a pH under 4.2, and said protein is in an amount sufficient to prevent precipitation of said erythrosine.

4. The process of claim 3, in which the protein is selected from the group consisting of vegetable proteins, animal proteins, salts derived from such proteins, and combinations thereof.

5. A purple-colored-grape-flavored liquid food or beverage having a coloration between red and blue and having a pH under 4.2, comprising water, an edible soluble or dispersible protein and erythrosine, said protein being stained by said erythrosine and dispersed throughout said liquid food or beverage.

6. A liquid food or beverage of claim 5, in which the protein is selected from the group consisting of vegetable proteins, animal proteins, salts derived from such proteins, and combinations thereof.

* * * * *

UNITED STATES PATENT OFFICE
CERTIFICATE OF CORRECTION

Patent No. 4,167,587    Dated September 11, 1979

Inventor(s)  Richard C. Danforth

It is certified that error appears in the above-identified patent and that said Letters Patent are hereby corrected as shown below:

Col. 1, line 32, should read: - other red-related drinks -

Col. 2, line 43, the last three words should read: - liquid foods and -

Col. 2, lines 46 to 47, the third color mentioned should be:
- FD & C Blue #2 - , and the fifth color should read:
- FD & C Yellow #5 - .

Col. 3, line 60, the fifth protein on this line should read:
- peptones - .

Col. 6, line 18, the second line of claim 2 should read:
- which the protein is selected from the group consisting -

Signed and Sealed this

Fifteenth Day of January 1980

[SEAL]

Attest:

SIDNEY A. DIAMOND

Attesting Officer    Commissioner of Patents and Trademarks